United States Patent
Romig et al.

(10) Patent No.: US 9,500,367 B2
(45) Date of Patent: Nov. 22, 2016

(54) COMBUSTION CASING MANIFOLD FOR HIGH PRESSURE AIR DELIVERY TO A FUEL NOZZLE PILOT SYSTEM

(71) Applicant: General Electric Company, Schenectady, NY (US)

(72) Inventors: Bryan Wesley Romig, Simpsonville, SC (US); Brandon Taylor Overby, Spartanburg, SC (US)

(73) Assignee: General Electric Company, Schenectady, NY (US)

( * ) Notice: Subject to any disclaimer, the term of this patent is extended or adjusted under 35 U.S.C. 154(b) by 421 days.

(21) Appl. No.: 14/076,360

(22) Filed: Nov. 11, 2013

(65) Prior Publication Data

US 2015/0128606 A1  May 14, 2015

(51) Int. Cl.
| | |
|---|---|
| F23R 3/04 | (2006.01) |
| F23R 3/28 | (2006.01) |
| F23R 3/34 | (2006.01) |
| F02C 7/236 | (2006.01) |
| F23R 3/10 | (2006.01) |
| F23R 3/00 | (2006.01) |

(52) U.S. Cl.
CPC . *F23R 3/10* (2013.01); *F23R 3/04* (2013.01); *F23R 3/283* (2013.01); *F23R 3/343* (2013.01); *F02C 7/2365* (2013.01); *F23R 3/002* (2013.01)

(58) Field of Classification Search
CPC .......... F23R 3/10; F23R 3/286; F23R 3/343; F23R 3/14; F02C 7/222
See application file for complete search history.

(56) References Cited

U.S. PATENT DOCUMENTS

| | | | | |
|---|---|---|---|---|
| 3,866,413 | A * | 2/1975 | Sturgess | F23R 3/36 239/400 |
| 3,910,035 | A * | 10/1975 | Juhasz | F23R 3/26 60/39.23 |
| 4,050,238 | A * | 9/1977 | Holzapfel | F23R 3/30 431/116 |
| 4,255,927 | A * | 3/1981 | Johnson | F23R 3/26 60/39.23 |
| 5,515,680 | A * | 5/1996 | Fujimura | B01F 5/0405 239/434 |
| 5,983,642 | A * | 11/1999 | Parker | F02C 7/222 239/403 |
| 6,568,188 | B2 | 5/2003 | Kolman et al. | |
| 8,281,596 | B1 * | 10/2012 | Rohrssen | F23R 3/002 60/737 |
| 2004/0035114 | A1 * | 2/2004 | Hayashi | F23R 3/18 60/737 |

(Continued)

OTHER PUBLICATIONS

U.S. App. No. 13/749,661, filed Jan. 24, 2013, Romig et al.

*Primary Examiner* — Phutthiwat Wongwian
*Assistant Examiner* — Rene Ford
(74) *Attorney, Agent, or Firm* — Sutherland Asbill & Brennan LLP

(57) ABSTRACT

The present application provides a pilot manifold system for a combustor of a gas turbine engine. The pilot manifold system may include a casing with a casing manifold, an end cover connected to the casing and having an end cover passage in communication with the casing manifold, and a fuel nozzle mounted about the end cover. The fuel nozzle may include a pilot system in communication with the end cover passage.

11 Claims, 4 Drawing Sheets

(56) References Cited

U.S. PATENT DOCUMENTS

| | | |
|---|---|---|
| 2011/0162377 A1 | 7/2011 | Benjamin et al. |
| 2011/0225973 A1 | 9/2011 | Romig et al. |
| 2011/0252803 A1 | 10/2011 | Subramanian et al. |
| 2011/0265485 A1 | 11/2011 | Stoia et al. |
| 2011/0271683 A1 | 11/2011 | Johnson et al. |
| 2011/0289926 A1 | 12/2011 | Overby et al. |
| 2012/0036859 A1 | 2/2012 | Johnson et al. |
| 2012/0102958 A1 | 5/2012 | Stoia et al. |
| 2012/0247108 A1 | 10/2012 | Romig et al. |
| 2012/0312890 A1 | 12/2012 | Romig |
| 2013/0067923 A1 | 3/2013 | Overby et al. |
| 2013/0180260 A1 | 7/2013 | Romig et al. |
| 2013/0219899 A1 | 8/2013 | Uhm et al. |
| 2013/0263571 A1 | 10/2013 | Stoia et al. |
| 2013/0269364 A1 | 10/2013 | Romig et al. |
| 2014/0116066 A1* | 5/2014 | Melton ............... F23R 3/28 60/806 |
| 2014/0250981 A1* | 9/2014 | Overby ............... F23R 3/28 73/40 |

* cited by examiner

COMBUSTION CASING MANIFOLD FOR HIGH PRESSURE AIR DELIVERY TO A FUEL NOZZLE PILOT SYSTEM

TECHNICAL FIELD

The present application and the resultant patent relate generally to gas turbine engines and more particularly relate to a gas turbine engine having a combustion casing manifold for delivering high pressure air to an end cover and a fuel nozzle pilot system.

BACKGROUND OF THE INVENTION

Generally described, a gas turbine engine includes a combustor to ignite a mixture of fuel and air so as to produce combustion gases to drive a turbine. The combustor may include a number of fuel nozzles and a pressurized combustion zone surrounded by a liner, a flow sleeve, and an outer casing. The liner and the flow sleeve may define a cooling flow path therebetween. During operation, high pressure air may be discharged from a compressor or elsewhere into the combustor. A portion of the air may be mixed with fuel and ignited within the combustion chamber as described above. A further portion of the air may be channeled through the flow path for cooling the liner and other components. This process may be repeated by any number of combustors positioned in a circumferential array.

Given the multiple uses of the high pressure air, packaging concerns may arise with respect to the end cover and the piping needed for cooling, sealing, and fuel delivery. For example, a portion of the high pressure airflow may be routed to a fuel nozzle pilot system. Pilot flame stability may improve outer nozzle blow off characteristics and also may improve turndown by keeping the outer fuel nozzles attached and more completely burning out carbon monoxide and the like. Due to these packaging constraints, however, the amount of the airflow to the pilot system may be reduced and hence may negatively impact the performance of the pilot system and the overall gas turbine engine.

There is thus a desire for an improved combustor casing manifold such as a pilot manifold system for high pressure air delivery to the end cover and elsewhere so as to reduce packaging concerns. Such a combustor casing manifold may deliver the high pressure air to, for example, a fuel nozzle pilot manifold system while avoiding further intrusions into the end cover and related locations.

SUMMARY OF THE INVENTION

The present application and the resultant patent thus provide a pilot manifold system for a combustor of a gas turbine engine. The pilot manifold system may include a casing with a casing manifold, an end cover connected to the casing and having an end cover passage in communication with the casing manifold, and a fuel nozzle mounted about the end cover. The fuel nozzle may include a pilot system in communication with the end cover passage for a flow of air therethrough.

The present application and the resultant patent further may provide a method of supplying a flow of air and a flow of fuel to a fuel nozzle pilot system of a combustor. The method may include the steps of providing the flow of air through a casing of the combustor, providing the flow of air from the casing to an end cap of the combustor and to the fuel nozzle pilot system, and providing the flow of fuel through the end cap of the combustor and to the fuel nozzle pilot system for combustion downstream thereof The present application and the resultant patent further provide a combustor of a gas turbine engine. The combustor may include a casing, an end cover connected to the casing, a fuel nozzle mounted about the end cover, and pilot manifold system for delivering a flow of air through the casing and to the fuel nozzle as opposed to through the end cap.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
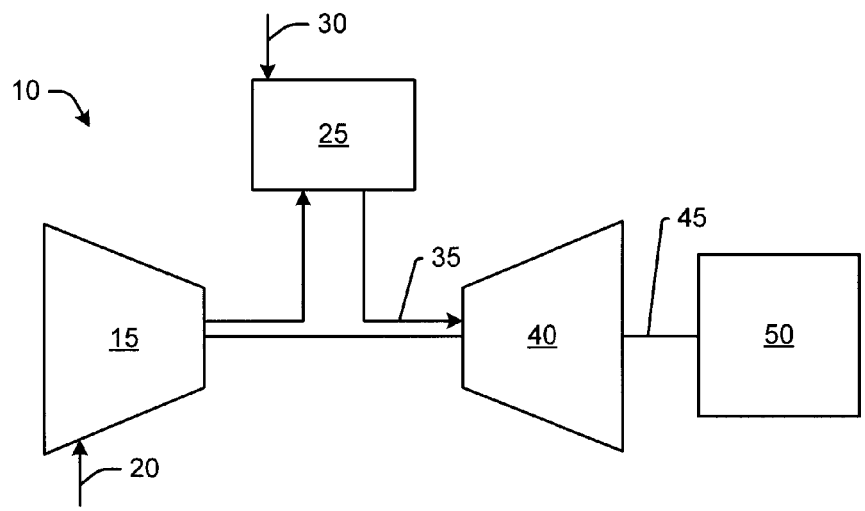
FIG. 1 is a schematic diagram of a gas turbine engine showing a compressor, a combustor, and a turbine.

Referring now to the drawings, in which like numerals refer to like elements throughout the several views, FIG. 1 shows a schematic view of a gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of the combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels and combinations thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
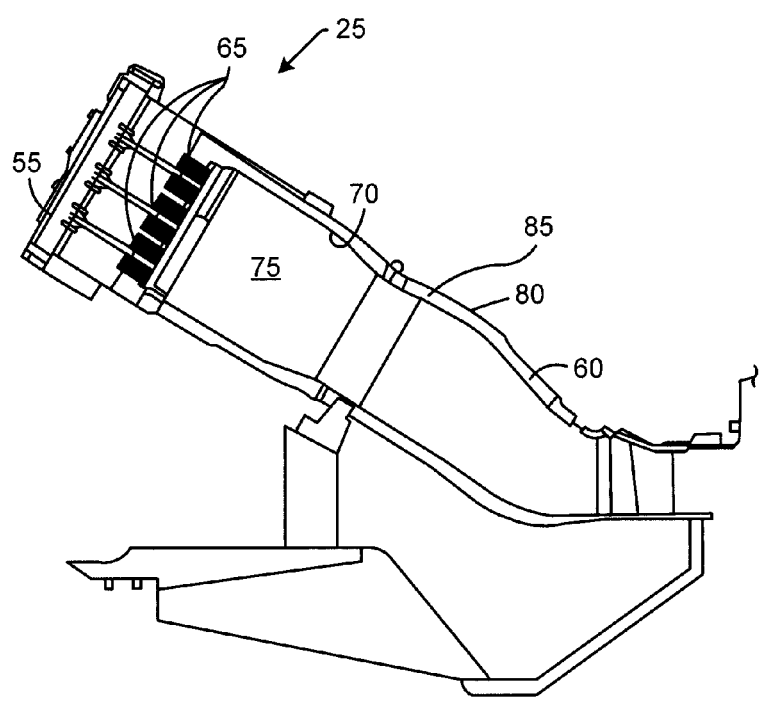
FIG. 2 is a schematic diagram of a combustor that may be used with the gas turbine engine of FIG. 1.

FIG. 2 shows a schematic diagram of an example of the combustor 25 that may be used with the gas turbine engine 10 described above and the like. Generally described, the combustor 25 may extend from an end cover 55 at a head end to a transition piece 60 at an aft end about the turbine 40. A number of fuel nozzles 65 may be positioned about the end cover 55. A liner 70 may extend from the fuel nozzles 65 towards the transition piece 60 and may define a pressurized combustion zone 75 therein. The liner 70 may be surrounded by a flow sleeve 80. The liner 70 and the flow sleeve 80 may define a flow path 85 therebetween for the flow of air 20 from the compressor 15 or from other sources. Any number of the combustors 25 may be used herein in a can-annular array and the like. The combustor 25 described herein is for the purpose of example only. Combustors with other components and other configurations may be used herein.

Figure 3:
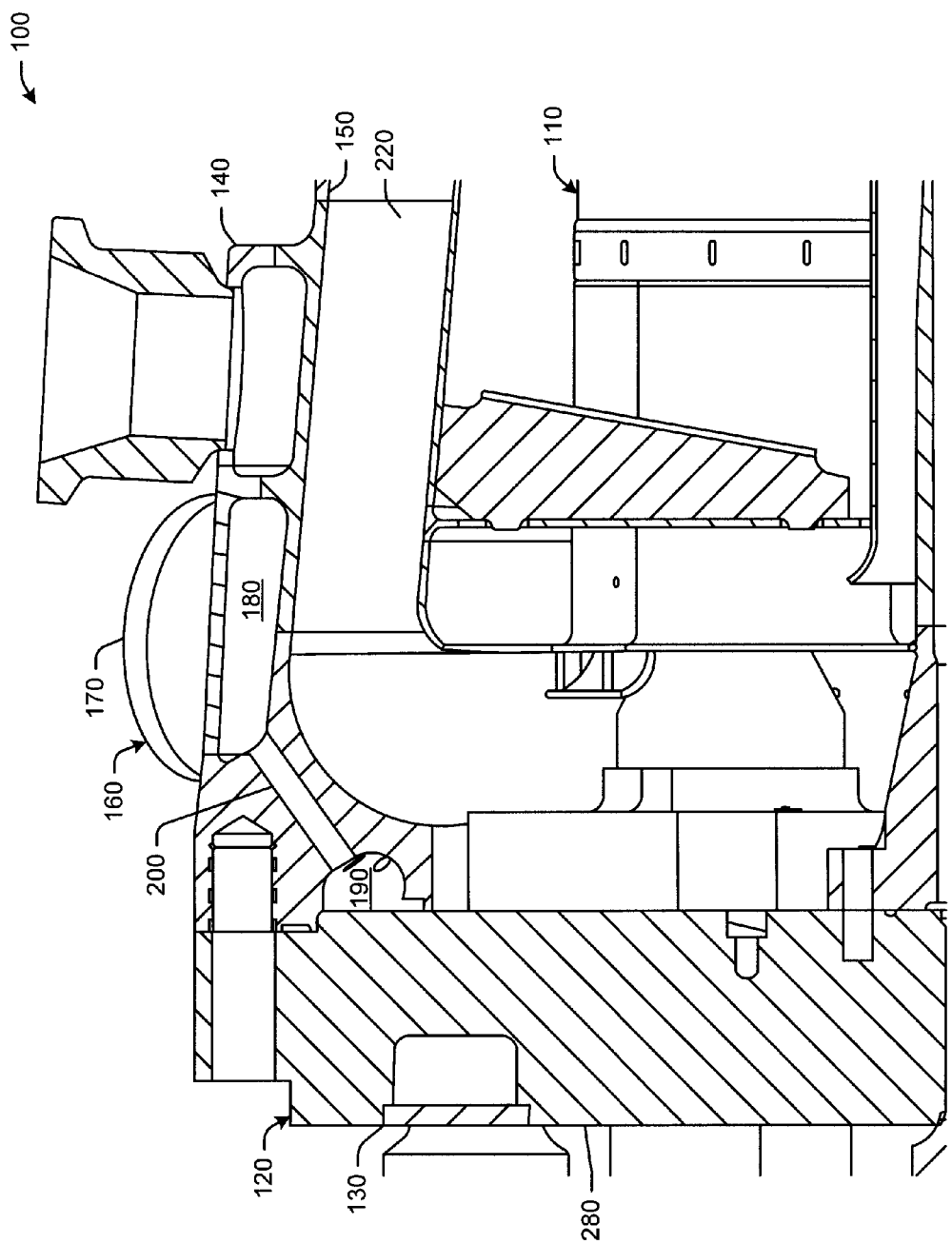
FIG. 3 is a partial sectional view of a combustor with a pilot manifold system feeding a fuel nozzle pilot system as may be described herein via the combustor casing.
Figure 4:
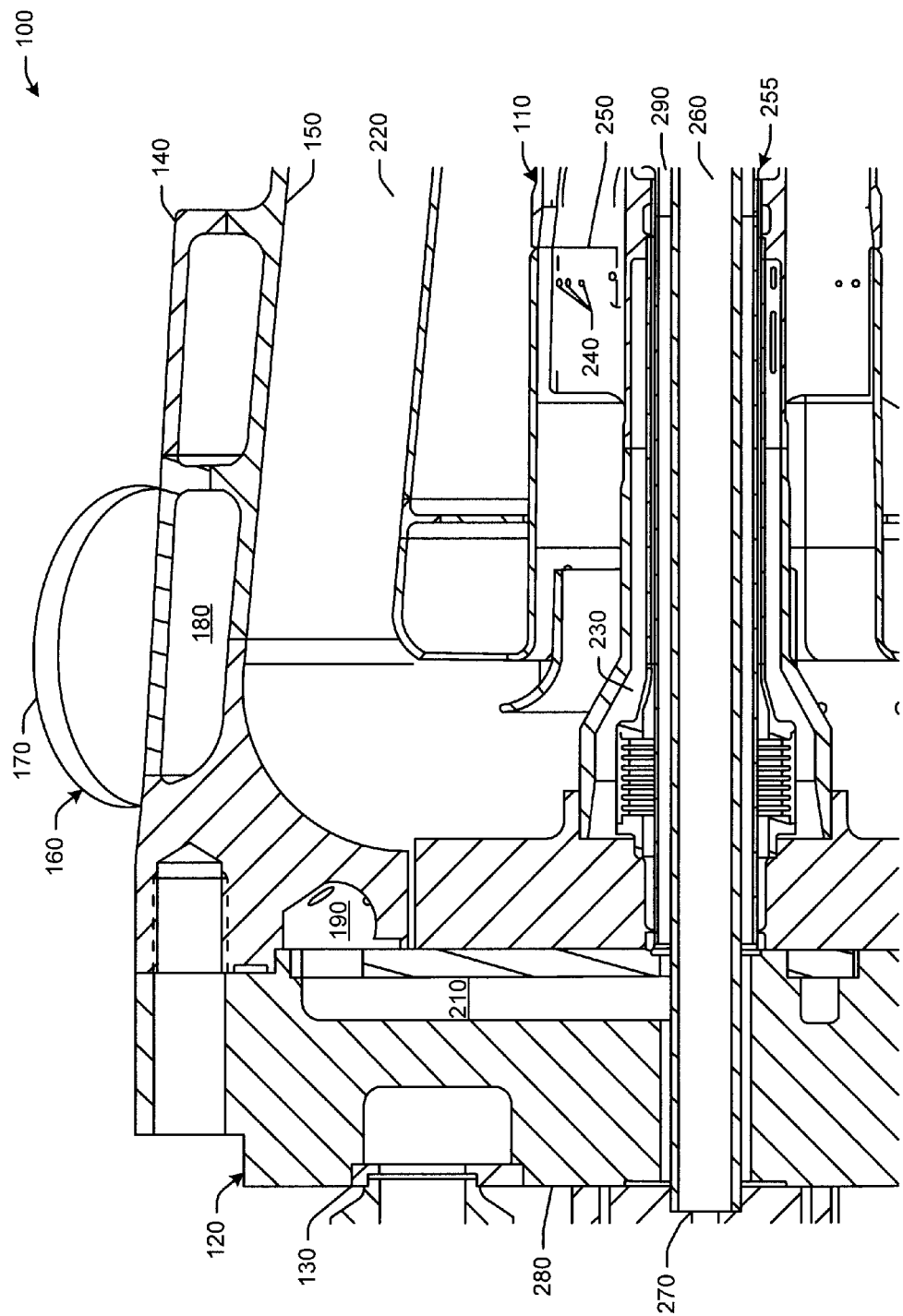
FIG. 4 is a further sectional view of the pilot manifold system of the combustor of FIG. 3.
Figure 5:
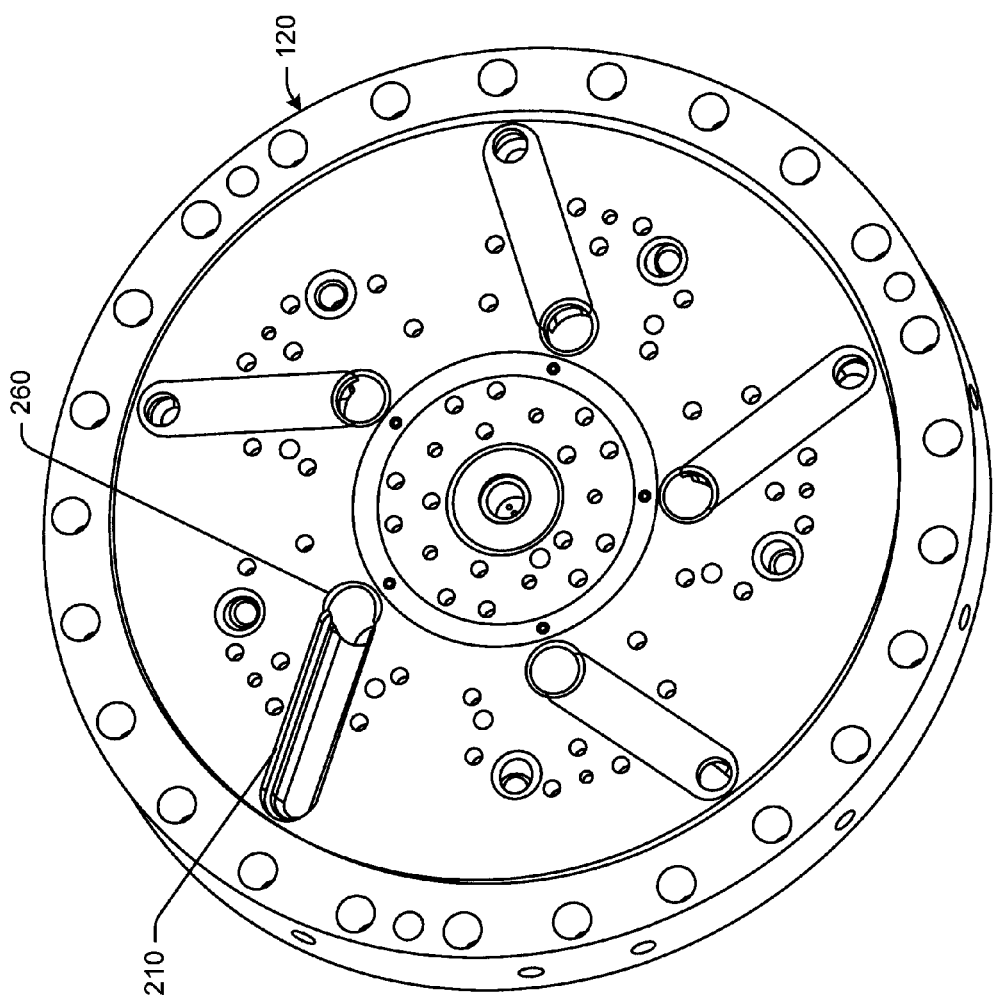
FIG. 5 is a perspective view of an end cover for use with the pilot manifold system of the combustor of FIG. 3.

FIGS. 3-5 show an example of a combustor 100 as may be described herein and may be used with the gas turbine engine 10 and the like. The combustor 100 may include a number of fuel nozzles 110 positioned therein. Any number or type of fuel nozzles 110 may be used herein. The fuel nozzles 110 may be mounted about an end cover 120. As described above, the end cover 120 may have a number of penetrations 130 therethrough. These penetrations 130 may allow for the passage of fuel, air, and/or other types of fluids. The combustor 100 may be enclosed by a casing 140. The casing 140 may include a liner 150, a flow sleeve, and other structures forming flow paths and the like therethrough. The casing 140 may have any size, shape, or configuration. Other components and other configurations may be used herein.

The combustor 100 may include a pilot manifold system 160 positioned about the casing 140. The pilot manifold system 160 may include one or more air inlets 170. The air inlets 170 may be in communication with a portion of the flow of air 20 from the compressor 15 or otherwise. Other sources of high pressure compressed air may be used herein. The pilot manifold system 160 may define one or more external casing manifolds 180 about the casing 140. The external casing manifolds 180 may be in communication with one or more of the air inlets 170. The external casing manifolds 180 may have any size, shape, or configuration. The external casing manifold 180 may be in communication with one or more internal casing manifolds 190. The internal casing manifolds 190 may have any size, shape, or configuration. The external casing manifolds 180 and the internal casing manifolds 190 may be in communication via one or more pass-through holes 200. Any number of the pass-through holes 200 may be used in any size, shape, or configuration.

The internal casing manifolds 190 may be positioned about the end cover 120. The end cover 120 may have a number of end cover passages 210 formed therein. One or more of the internal casing manifolds 190 may be in communication with one or more of the end cover passages 210. The end cover passages 210 may have any size, shape, or configuration. In turn, the end cover passages 210 may be in communication with the fuel nozzles 110 so as to provide the flow of air 20 thereto. Other components and other configurations may be used herein.

Each of the fuel nozzles 110 include a number of air passageways 220 and fuel passageways 230 therein. The flow of air 20 and the flow of fuel 30 may mix downstream of a number of fuel injection ports 240 positioned in a number of swozzle vanes 250 and the like. Other types of injection ports may be used. The flow of air 20 and the flow of fuel 30 then may be ignited downstream of the fuel nozzles 110 as is described above. Many other types of fuel nozzle designs may be used herein. Other components and other configurations may be used herein.

The fuel nozzles 110 also may include a pilot system 255. The pilot system 255 may include one or more pilot fuel passages 260 therein. The pilot fuel passage 260 may extend from a pilot fuel source 270 on a cold size of the end cover 190 and through the end cover 120 about the end cover passages 210. The pilot fuel passage 260 then may continue through the fuel nozzle 110 to a tip thereof. The pilot fuel passage 260 may be surrounded by one or more pilot air passages 290. The pilot air passage 290 may extend from the end cover passage 210 of the pilot manifold system 160 or elsewhere and through the fuel nozzle 110 to the tip thereof. Other components and other configurations may be used herein.

The pilot manifold system 160 thus provides the high pressure air 20 to the pilot system 255 through the casing 140 without interfering with the piping needed for cooling, sealing, and fuel delivery positioned about the end cover 190. Specifically, the pilot manifold system 160 delivers the flow of air 20 through the air inlets 170, the external casing manifold 180, the internal casing manifold 190, and the end cover passages 210 directly to the pilot air passage 290. The flow of air 20 in the pilot air passage 290 then may mix with the flow of fuel 30 from the pilot fuel passage 260 for combustion downstream of the fuel nozzle 110. Other components and other configurations may be used herein.

The pilot manifold system 160 thus delivers an efficient and adequate amount of air 20 so as to ensure adequate performance of the pilot system 255. Moreover, the use of the casing manifolds 180, 190 of the pilot manifold system 160 eliminates a further penetration into the end cover 120 and the associated piping therewith. The adequate flow of air 20 provides flame stability about the pilot flame for improved outer nozzle blow off characteristics and also may improve turndown by keeping the outer fuel nozzles attached and more completely burning out carbon monoxide and the like. The pilot system 255 thus provides stability with limited emissions of nitrogen oxides and the like via the pilot manifold system 160.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A pilot manifold system for a combustor of a gas turbine engine, comprising:
   a casing extending along and surrounding a combustion chamber, the casing comprising a first internal casing manifold connected to a second internal casing manifold by a pass-through hole configured to send air from the first to the second internal manifold;
   an air inlet in communication with the first internal casing manifold and configured to receive air from outside the casing;
   an end cover connected to an end of the casing, wherein the end cover contains an end cover passage configured to receive the air from the second internal casing manifold;
   a fuel nozzle mounted about the end cover, wherein the fuel nozzle has a pilot system that receives the air from an outlet of the end cover passage.

2. The pilot manifold system of claim 1, wherein the end cover comprises a pilot fuel passage therethrough in communication with a pilot fuel source.

3. The pilot manifold system of claim 2, wherein the pilot fuel source is positioned about a cold side of the end cover.

4. The pilot manifold system of claim 2, wherein the end cover passage is in communication with the pilot fuel passage.

5. The pilot manifold system of claim 1, wherein the fuel nozzle comprises an air passageway and a fuel passageway therein.

6. The pilot manifold system of claim 1, wherein the pilot system comprises a pilot fuel passage therein.

7. The pilot manifold system of claim 1, wherein the pilot system comprises a pilot air passage therein.

8. The pilot manifold system of claim 7, wherein the pilot air passage is in communication with the end cover passage.

9. The pilot manifold system of claim 1, wherein the fuel nozzle comprises a plurality of fuel injection ports.

10. The pilot manifold system of claim 9, wherein the plurality of fuel injection ports are positioned about a swozzle vane.

11. A method of supplying a flow of air and a flow of fuel to the fuel nozzle pilot system of the pilot manifold system of claim 1, comprising:
   providing the flow of air through the casing of the combustor;
   providing the flow of air from the casing to the end cap of the combustor and to the fuel nozzle pilot system; and
   providing the flow of fuel through the end cap of the combustor and to the fuel nozzle pilot system.

\* \* \* \* \*